United States Patent
Hoyle et al.

(10) Patent No.: US 7,624,632 B1
(45) Date of Patent: Dec. 1, 2009

(54) CONSTANT-TEMPERATURE-DIFFERENCE FLOW SENSOR, AND INTEGRATED FLOW, TEMPERATURE, AND PRESSURE SENSOR

(75) Inventors: Scott Baxter Hoyle, Maple Shade, NJ (US); Ertugrul Berkcan, Niskayuna, NY (US); Michael Anthony McSweeney, Spotswood, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/375,695

(22) Filed: Aug. 17, 1999

(51) Int. Cl.
*G01F 1/68* (2006.01)
(52) U.S. Cl. .................................................. 73/204.11
(58) Field of Classification Search .............. 73/204.11, 73/204.26–204.28, 202.5, 202.13; 123/480; 137/227
See application file for complete search history.

(56) References Cited

U.S. PATENT DOCUMENTS

| | | | | |
|---|---|---|---|---|
| 5,233,868 A | * | 8/1993 | Coats et al. | 73/204.18 |
| 5,931,140 A | * | 8/1999 | Maloney | 123/480 |
| 5,965,813 A | * | 10/1999 | Wan et al. | 73/204.26 |
| 5,973,313 A | * | 10/1999 | Redford et al. | 250/210 |
| 6,062,077 A | * | 5/2000 | Azima | 73/204.27 |
| 6,125,695 A | * | 10/2000 | Alvesteffer et al. | 73/204.27 |
| 6,199,575 B1 | * | 3/2001 | Widner | 137/227 |

\* cited by examiner

*Primary Examiner*—Jewel Thompson
(74) *Attorney, Agent, or Firm*—Duane Morris

(57) ABSTRACT

An integrated sensor for automated systems includes a flow sensor, a temperature sensor, a pressure sensor, and a network interface. In a particular embodiment of the invention, the flow sensor includes a temperature sensor (26) which determines the temperature of the fluid flowing in a flow path (12). A heater (18) is coupled to the flow path, and is energized by a controller (20) with sufficient electrical power to raise the temperature of the heater above the measured fluid temperature by a fixed temperature difference. In order to aid in determining the temperature difference, a sensor (24) may be associated with the heater (18). The amount of power required to maintain the temperature difference is a measure of the flow velocity. The volumetric flow rate is the product of the flow velocity multiplied by the area of the flow sensor. The mass flow rate is the product of the volumetric flow rate multiplied by the mass density of the fluid. In a particular embodiment, the pressure sensor is ratiometric.

12 Claims, 11 Drawing Sheets

CONSTANT-TEMPERATURE-DIFFERENCE FLOW SENSOR, AND INTEGRATED FLOW, TEMPERATURE, AND PRESSURE SENSOR

FIELD OF THE INVENTION

This invention relates to integrated flow, temperature and pressure sensors for fluids, and more particularly to such sensors in which a heater is maintained at a constant temperature differential above the temperature of the flowing fluid, a temperature sensor which coacts with the heater to provide flow information, a ratiometric pressure sensor provides fluid pressure, and a controller processes the individual sensor signals and communicates digitally over a digital transmission path.

BACKGROUND OF THE INVENTION

Modern ships employ crew members whose function is to monitor various parts of the vessel, and to operate equipment such as hoists, radar, bridge equipment, and to monitor and control valves located throughout the ship. The costs associated with maintaining a large crew are disadvantageous, and such costs include the costs associated with paying wages, maintaining the crew member in terms of food and life support (bathrooms, hot water, and the like), and also includes the costs of training the crew member for the particular job. To the extent that a ship's functions can be automated, the necessary crew can be reduced.

The problem is particularly acute in war vessels, as a relatively large crew must be maintained in order to have the resources to perform battle damage repair and recovery.

If reliable and inexpensive integrated pressure-and-flow-sensors were available, such sensors could be located in various pipes within a ship or a factory, and their readings could be compared to determine if there were a break or leak (break) in the intervening pipe or flow path. Such inexpensive sensors could also be used to improve process controls in chemical and other processes. Present-day flow sensors include rotating-propeller or linear types, differential-pressure aperture, ball-in-tapered-tube, vane or deflection type, ultrasonic, and hot-wire anemometer. The rotating-propeller is very accurate, but may degrade over time as a function of corrosion and deposits, and may fail catastrophically in the presence of large debris. The differential-pressure type of flow sensor requires an obstructing aperture or change of geometry of the flow path, which is very undesirable, and when the application requires many such sensors to be cascaded, may substantially impede the flow. Also, the small pressure changes attributable to relatively large apertures may undesirably introduce noise into the measurement. The ball-in-tube type requires a vertical orientation, and the tube must be transparent in order to optically detect the location of the ball. Additionally, in a vehicle which has vertical motion, the vertical acceleration tends to add to the gravitational force acting on the ball, and will tend to affect the reading, and therefore the accuracy. The vane deflection type of flow sensor obstructs the flow with the vane, and is not known for their accuracy. The ultrasonic type of flow sensor does not necessarily impede the flow, but is expensive, and may not be suitable for use in a noisy environment, or in an environment in which many such sensors are in use, so that the ultrasonic signals of one affect the others in the same flow path. The hot-wire anemometer is not known for use in fluids other than air, would not work in a conductive fluid, and the thin wire would be subject to breakage by circulating debris in some applications.

Improved integrated pressure and flow sensors are desired.

SUMMARY OF THE INVENTION

An integrated fluid flow, temperature and pressure sensor according to an aspect of the invention includes a body. The body includes or contains a path, such as a pipe, for the flow of fluid. The integrated sensor also includes a temperature determining means or temperature sensor located within the body, and coupled to the path, for making a determination of the upstream temperature of a fluid flowing in the path: in some cases, the upstream temperature may be estimated from system parameters, or determined by an upstream temperature sensor which is not a part of the integrated flow and pressure sensor, or by a downstream temperature sensor. A heating means or heater is located within the body, and is at least thermally coupled to the path, for heating the fluid therein. A control means or controller is located within the body, and is coupled to the heating means and to the temperature determining means, for applying power to the heating means in an amount required to raise the temperature of the heating means above the upstream temperature by a predetermined amount. The control means may also convert the value of the power into a flow signal representing a corresponding flow. A pressure sensing means or sensor is located within the body, for sensing fluid pressure in the path, for generating an electrical signal representative of the pressure of the fluid. The pressure-representative signal will ordinarily be an analog signal. A signal processing means or processor is located within the body, and coupled to the control means, to the temperature determining means, and to the pressure sensing means, for processing the flow signal, the temperature signal, and the pressure signal, for generating digital signals representing the flow, the temperature, and the pressure. The digital signals are preferably in a format suitable for transmission over a digital signal transmission path. A signal connection means or connector is mounted on the body, and is connected to at least the signal processing means, for providing a standard connection between the signal processing means and the signal transmission path.

In one embodiment of the integrated sensor, the control means comprises a second temperature determining means or temperature sensor coupled to the heating means, for determining the temperature of the heating means. The second temperature determining means may be an electrical resistor, and may include resistance measuring means coupled to the heating means for measuring the electrical resistance of the heating means, and the control means may include means for converting the value of the resistance into a corresponding temperature.

In an embodiment of the integrated sensor, the control means comprises a memory preprogrammed with a value corresponding to the cross-sectional area of the path, and the flow determination is in the form of one of (a) mass quantity per unit time, (b) volume per unit time, and (c) both mass quantity and volume per unit time.

In an embodiment of the integrated sensor, the path is associated with a peripheral wall, and the heating means is in the form of a peripheral structure surrounding the peripheral wall, and in thermal contact therewith.

In an avatar of the integrated sensor, the peripheral wall is made from conventional materials having a thickness commensurate with the pressure and temperature of the fluid, except in the region in or near that in which the heater is thermally coupled, in which region the peripheral wall is made from a material having higher strength than the conventional materials, of a thickness less than the commensurate thickness.

In another avatar of the integrated sensor, the control means and the signal processing means are integrated into a single unit, which may be, for example, a single printed wiring card or a single closed electronics module.

According to one version of the integrated sensor, the pressure sensing means is a ratiometric pressure sensor, and preferably of the microelectromechanical system (MEMS) type.

In one very advantageous embodiment, the integrated sensor is further integrated with a remotely controllable valve. In this embodiment, a controllable valve having a controllable flow channel is connected by a further fluid path to the flow path of the integrated sensor. The controllable valve is located within the same body as that in which the integrated sensor is located. This particular embodiment is most advantageously used in a system further including a control processor at a location remote from the body of the integrated sensor, and coupled thereto by way of the transmission path, for correlating valve state with fluid flow for one of (a) verifying operation of an element of the integrated sensor and (b) verifying the integrity of fluid paths to which the integrated sensor is connected.

DESCRIPTION OF THE INVENTION

Figure 1A:
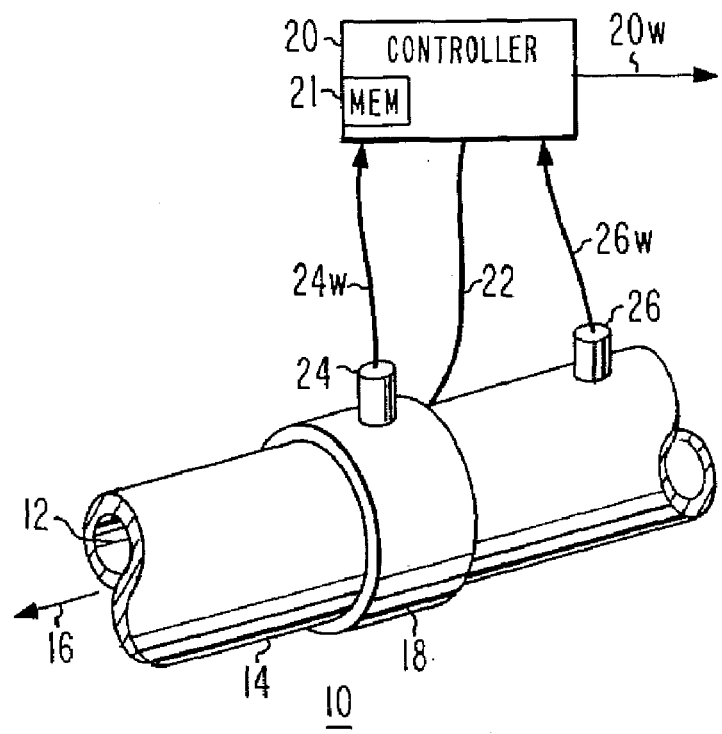
FIG. 1a is a simplified diagram of a flow sensor using a heater, which uses a heater, two temperature sensors, and a controller, all according to an aspect of the invention, and which flow sensor may be used in an integrated pressure-and-flow sensor according to another aspect of the invention.

In FIG. 1a, a sensor 10 includes a fluid path 12 in the form of a round pipe 14 through which fluid flows in a direction designated by an arrow 16. Sensor 10 supports an annular peripheral electrical heating element or heater 18. A flow of electrical energy or power is applied to heater 18 from a controller 20 by way of a set 22 of wires. A temperature sensor 24 is coupled to heating element 18, for producing a signal representing the temperature of the heating element. The temperature-representative signal is applied to controller 20 by way of a set of wires 24w. Controller 20 includes a memory (Mem) designated 21. A further temperature sensor 26 is mounted to pipe 14 at a location upstream from heating element 18, for sensing the temperature of the fluid flowing in pipe 14, and for generating a signal representing the temperature of the fluid. The signal representing the temperature of the fluid is applied over a set of wires 26w to controller 20.

Figure 1B:
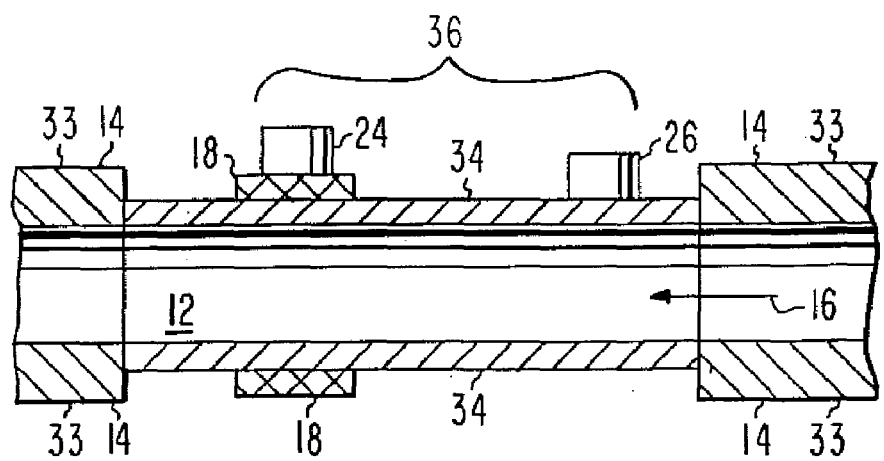
FIG. 1b is a cross-sectional view thereof.

FIG. 1b is a representation of a cross-section of the structure of FIG. 1a. In FIG. 1b, the wall of pipe 14 is made from conventional materials, designated as 33. The conventional materials may, depending upon the temperature and pressure of the fluid flowing in path 12, be materials such as brass, galvanized steel, stainless steel, or composite materials. In the sensing region 36, the pipe wall can be made of the same material as pipe 14, or can be made from a high-strength material 34, as for example titanium, which can be substantially thinner in cross-section than the conventional materials 33. This thinner cross-section, in turn, generally translates into better thermal transfer properties between the heater 18, the sensors 24 and 26, and the fluid within the sensing region 36. The sensing region 36 is connected to pipe 14 using standard connecting techniques.

In operation of the sensor 10 of FIG. 1a, the velocity of the flow of fluid is determined by sensing the upstream fluid temperature with sensor 26, and applying electrical energy from the controller 20 to the heating element 18 at a rate sufficient to raise the temperature of the heating element, as measured by sensor 24, to a second temperature, greater than the upstream-fluid temperature, by a fixed temperature difference. The measurement of power or the time rate of energy required to maintain the fixed temperature difference is an indication of the velocity of fluid flow in the fluid path.

In an alternative embodiment that provides a lower-cost, but lower-accuracy solution, upstream fluid temperature is estimated, rather than directly sensed, based on details of the system into which the sensor is installed. For example, if the upstream fluid is water which comes from the bottom of a lake in which the water temperature always remains at about 55° F., the upstream temperature measurement is not needed, and the upstream temperature may be assumed. This estimation obviates the need for upstream temperature sensor 26. All calculations are then based on the assumed upstream temperature.

In yet another alternative embodiment, the heater 18 of FIG. 1a is turned off periodically and allowed to attain the temperature of the fluid to provide the ambient, or upstream value. This heater-ON to heater-OFF duty cycle or period depends upon the thermal characteristics of the fluid, the sensor wall 14 (or 34) of FIG. 1b, and the expected temperature range of the fluid.

Once the fluid flow rate is known, the volume flow rate (gallons per minute, for example) is easily determined to be the product of the effective cross-section of the fluid path (the diameter of the pipe, taking into account boundary effects) multiplied by the fluid flow velocity. Given the density of the fluid, the mass flow rate (kilograms per second, for example)

is easily determined as the product of the volume flow rate multiplied by the density of the fluid. Controller 20 produces a signal representing one (or all) of fluid velocity, volume flow rate, and mass flow rate, and applies it over a signal path 20w to a remote indicator (not illustrated).

Figure 2:
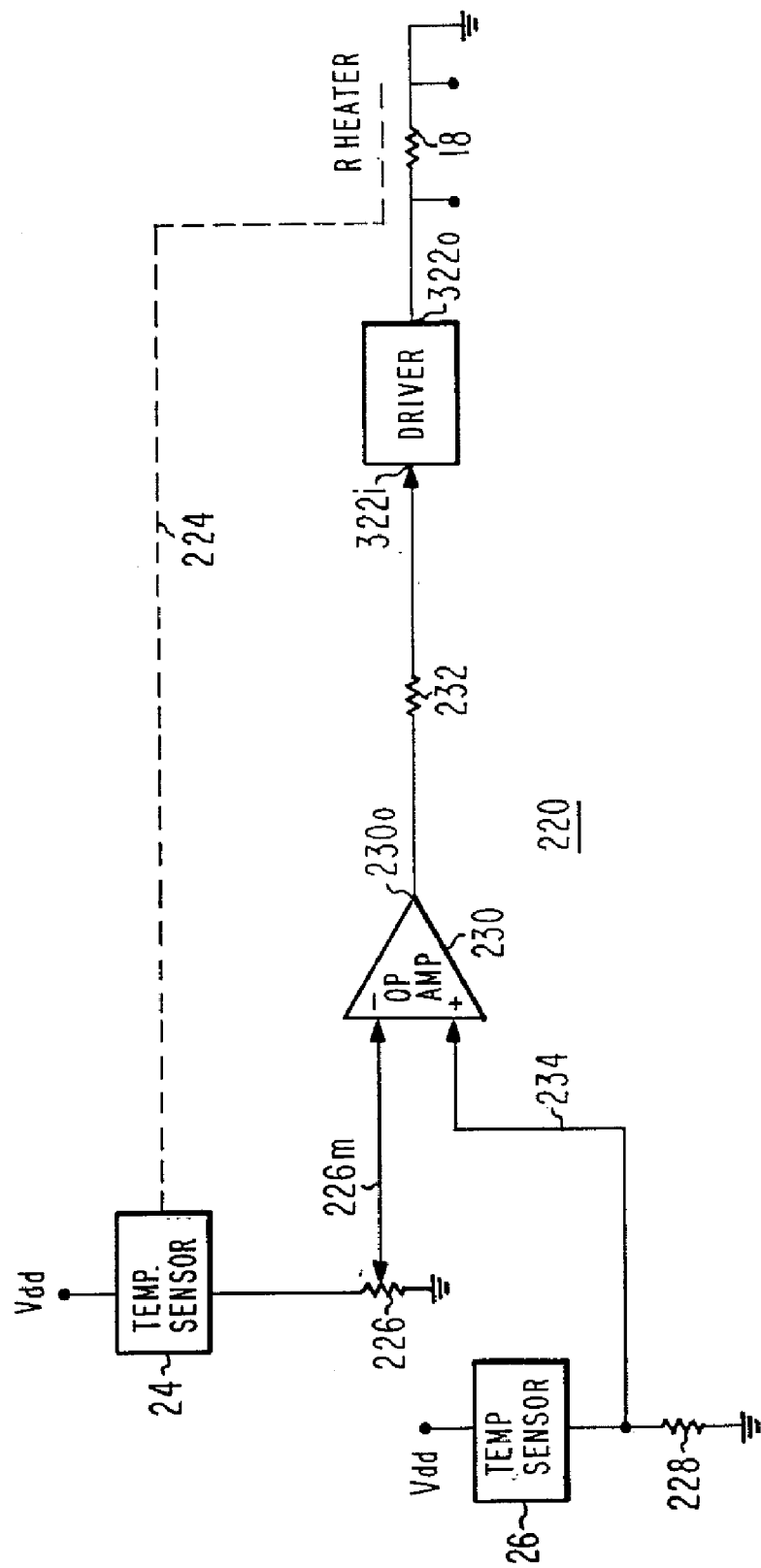
FIG. 2 is a simplified schematic diagram of an analog temperature controlling circuit which may be used in conjunction with the flow sensor of FIG. 1.

FIG. 2 is a simplified schematic diagram of an analog embodiment of a temperature controller 220 which may be used in controller 20 of FIG. 1a to maintain the heater temperature at a fixed value above the temperature of the upstream fluid. In FIG. 2, heater 18 is illustrated as a resistor having a resistance designated as $R_{heater}$. One end of resistor 18 is grounded, and the other is connected to the output port 322o of a driver circuit 322. In practice, driver circuit 322 may be as simple a circuit as a power field-effect device having its source connected to output port 322o, its drain connected to a supply voltage source, and its gate coupled to resistor 232. Resistor 18 of FIG. 2 is thermally coupled to temperature sensor 24, as illustrated by dash-line path 224. Sensor 24 is coupled with a tapped resistor 226 as a voltage divider coupled between a bus Vdd and ground. Similarly, sensor 26 is connected with a resistor 228 as a voltage divider coupled between Vdd and ground. If the sensors 24 and 26, and their associated resistors 226 and 228, respectively, are matched to each other. the same voltage will appear across the resistors 226 and 228. If the temperature of heating element 18 were to be slightly higher than that measured by sensor 26, sensor 24 would have a slightly lower resistance than sensor 28, and the voltage across resistor 226 would be slightly greater than the voltage across resistor 228.

An operational amplifier 230 of FIG. 2 has its output port 230o coupled, by way of a limiting resistor 232, to the input port 322i of driver circuit 322. Amplifier 230 has its noninverting (+) differential input port coupled by way of a path 234 to the junction of sensor 26 and resistor 228, for sensing the reference voltage, and the inverting (−) differential input port of amplifier 230 is connected to the movable tap 226m of resistor 226. The movable tap 226m can be set so that, when the temperature sensed by sensor 24 is slightly greater than the temperature sensed by sensor 26, the voltages at the inverting and noninverting input ports of amplifier 230 are essentially equal. Those skilled in the art will recognize the arrangement of FIG. 2 as a simple feedback control circuit, which tends to maintain the amount of current through heating element 18 at a value which results in a constant temperature. Simple filters can be used in conjunction with operational amplifier 230 to control the time constant of the feedback circuit. When the tap 226m of resistor 226 is set to sense a slightly lower voltage than that across resistor 226 as a whole, the feedback circuit 220 of FIG. 2 will act to maintain the heating element 18 at a temperature which is higher by a preset amount than the temperature sensed by sensor 26. Thus, the position of tap 226m of resistor 226 can be used to set or adjust the amount by which the temperature of heating element 18 is kept above the temperature sensed by sensor 26 in an analog feedback circuit such as circuit 220 of FIG. 2.

Figure 3:
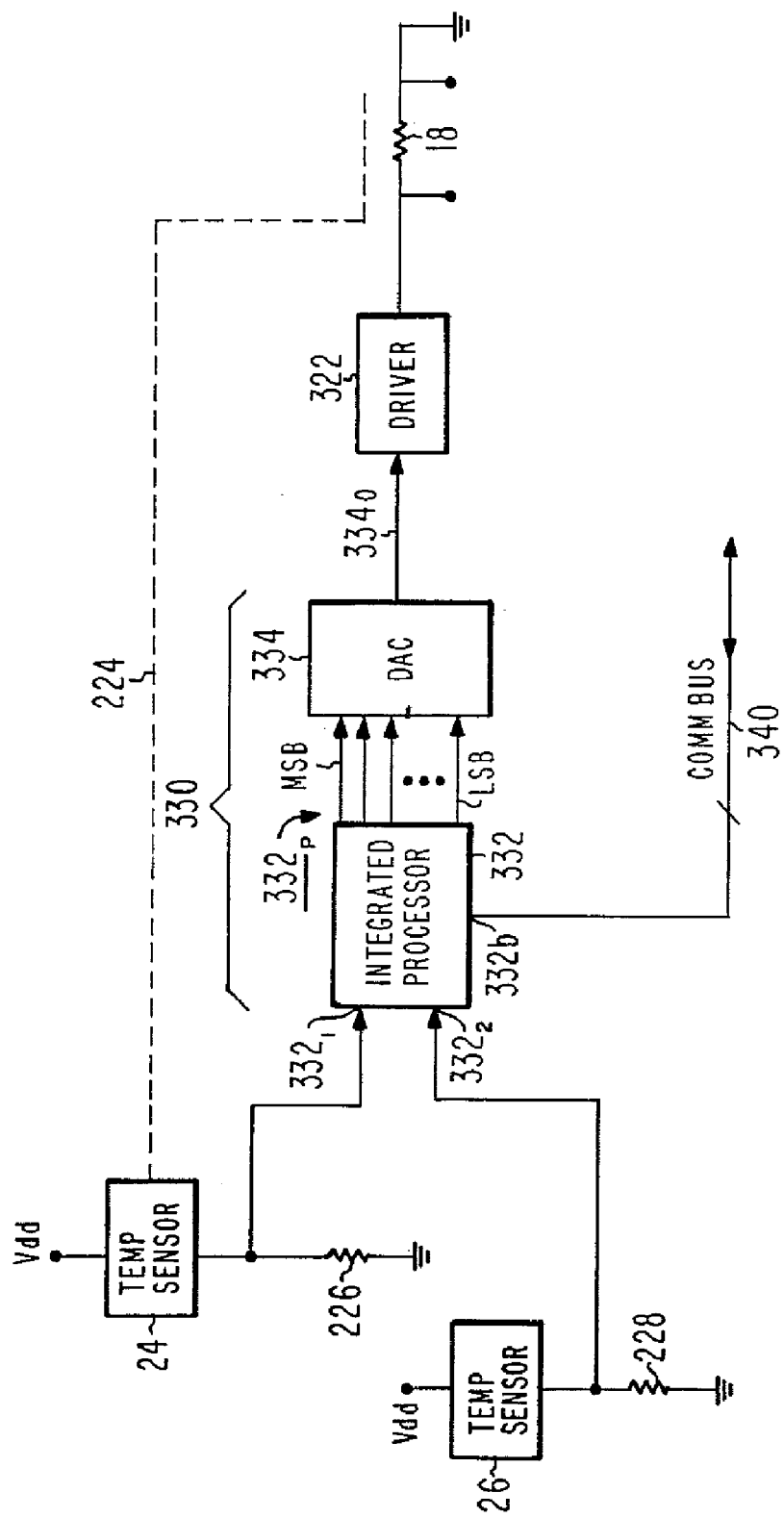
FIG. 3 is a simplified schematic diagram of a digital-based temperature controlling circuit using a digital-to-analog converter.

FIG. 3 differs from FIG. 2 in that a digital circuit 330 replaces the analog operational amplifier 230. In FIG. 3, digital circuit 330 includes an integrated processor 332 which includes analog input ports 332, and 3322 to which the temperature reference signals are applied from temperature sensors 24 and 26, respectively. Processor 332 also includes a set of ports designated generally as 332$_p$, at which the various bits of a digital signal are accessed. Thus, one of the individual ports of set 332$_p$ is designated as carrying the least-significant bit (LSB), another as carrying the most-significant bit (MSB), and the other ports (not designated) carry bits of intermediate significance. The bit signals carried by the ports of set 332$_p$ are applied to the input ports of a digital-to-analog converter (DAC) 334, which, as known, converts the digital signals into a corresponding quantized-analog signal on output signal path 334o. The analog signal is applied to a driver circuit 322. The integrated processor 330 of FIG. 2 may be a specialized integrated device such as Neuron processor MC143150 or the like, made by Motorola company of Schaumberg, Ill., under license from Echelon Company of Palo Alto, Calif. These processors are convenient for such use, because they include several desired functions, and further include a communication interface, illustrated as 332b in FIG. 3, which can be connected to a communication channel 340, such as a twisted pair, power line carrier, RF channel, or the like, in an automated system.

In operation of the arrangement of FIG. 3, the integrated processor 332 calculates an output voltage based on the sensed temperatures 24 and 26, and outputs a digital value on signal paths 332p, which value is then converted by digital-to-analog converter (DAC) 334 into an analog version of this output voltage. In essence, the processor 332 performs the function of a feedback control circuit, which will maintain the amount of electrical current through heating element 18 at a value sufficient to maintain the heating element at a specified value above the temperature measured by sensor 26. Compared with the feedback circuit using the Op-Amp 230 in FIG. 2, however, characteristics of this feedback, such as the temperature difference between the heater and the fluid, or the applicability to a different type of fluid, is programmable or software-adjustable (commendable), and independent of the setting of a variable resistor, such as 226 of FIG. 2. Consequently, no adjustable voltage divider is necessary in the arrangement of FIG. 3.

Figure 4:
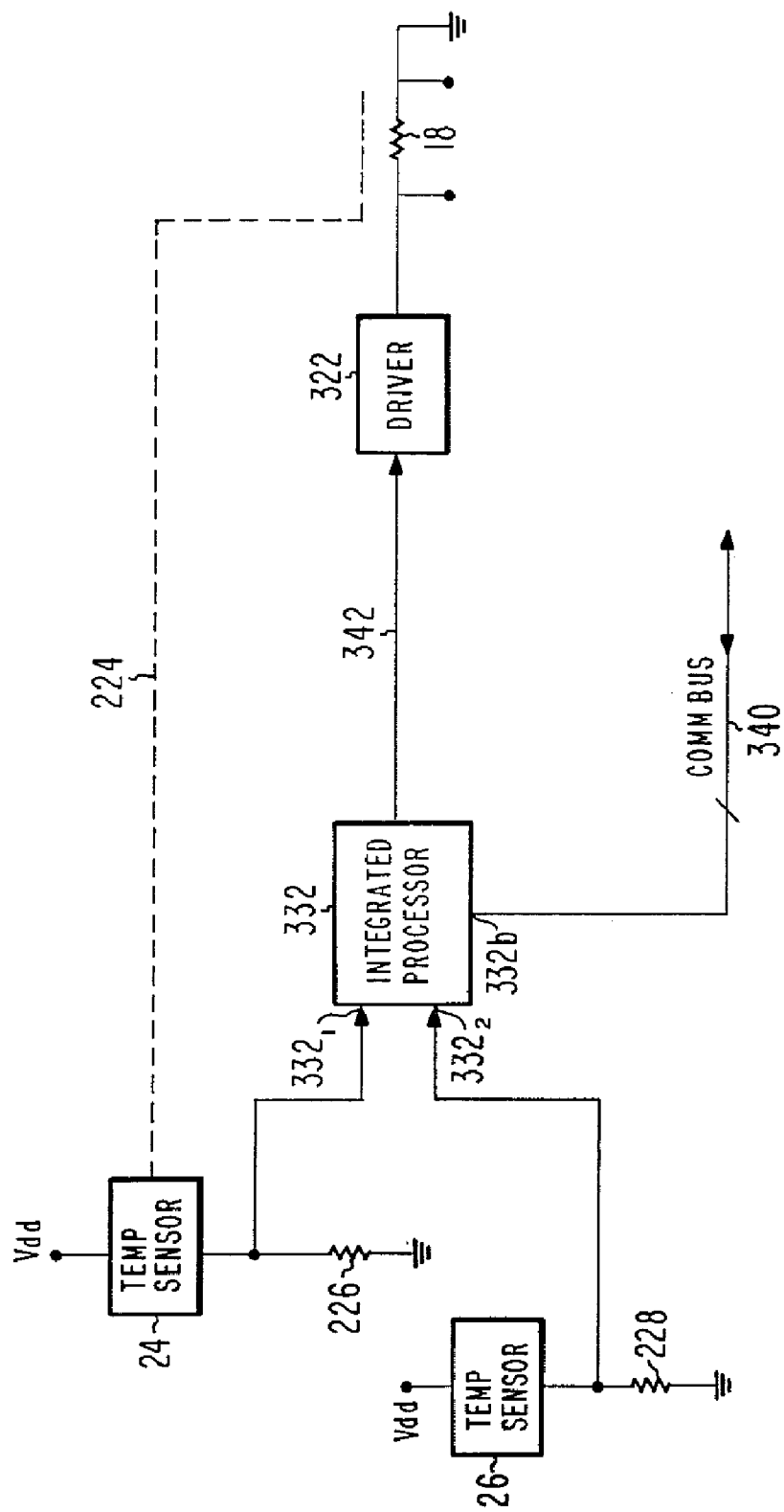
FIG. 4 is a simplified schematic diagram of a digital-based temperature controlling circuit using pulse-width modulation to eliminate the need for the DAC of FIG. 3.

FIG. 4 is similar to FIG. 2, but the processor 332 is arranged to produce, on signal path 342, a bi-level pulse-width modulated (PWM) output signal representative of the desired power or current to be applied to resistor 18. The pulse-width modulated signal is applied to the input of driver circuit 322. The heating element 18 in this circuit is driven by full-amplitude PWM signal rather than by a modulated-amplitude quantized-analog signal. This allows a direct connection between the integrated processor 332 and the driver circuit 322, and thereby eliminates the need for the digital-to-analog converter 334 of FIG. 3. When automated systems are to be used, it is often desirable to minimize the cost of each sensor. Deletion of the digital-to-analog converter aids in reducing cost and complexity of the assembly, and the simplification and reduction in the number of parts may be expected to improve reliability. Alternatively, a simple solid-state processor can be used. Moreover, a PWM type of output is readily available from a number of commercially available processors at little or no additional cost.

Figure 5:
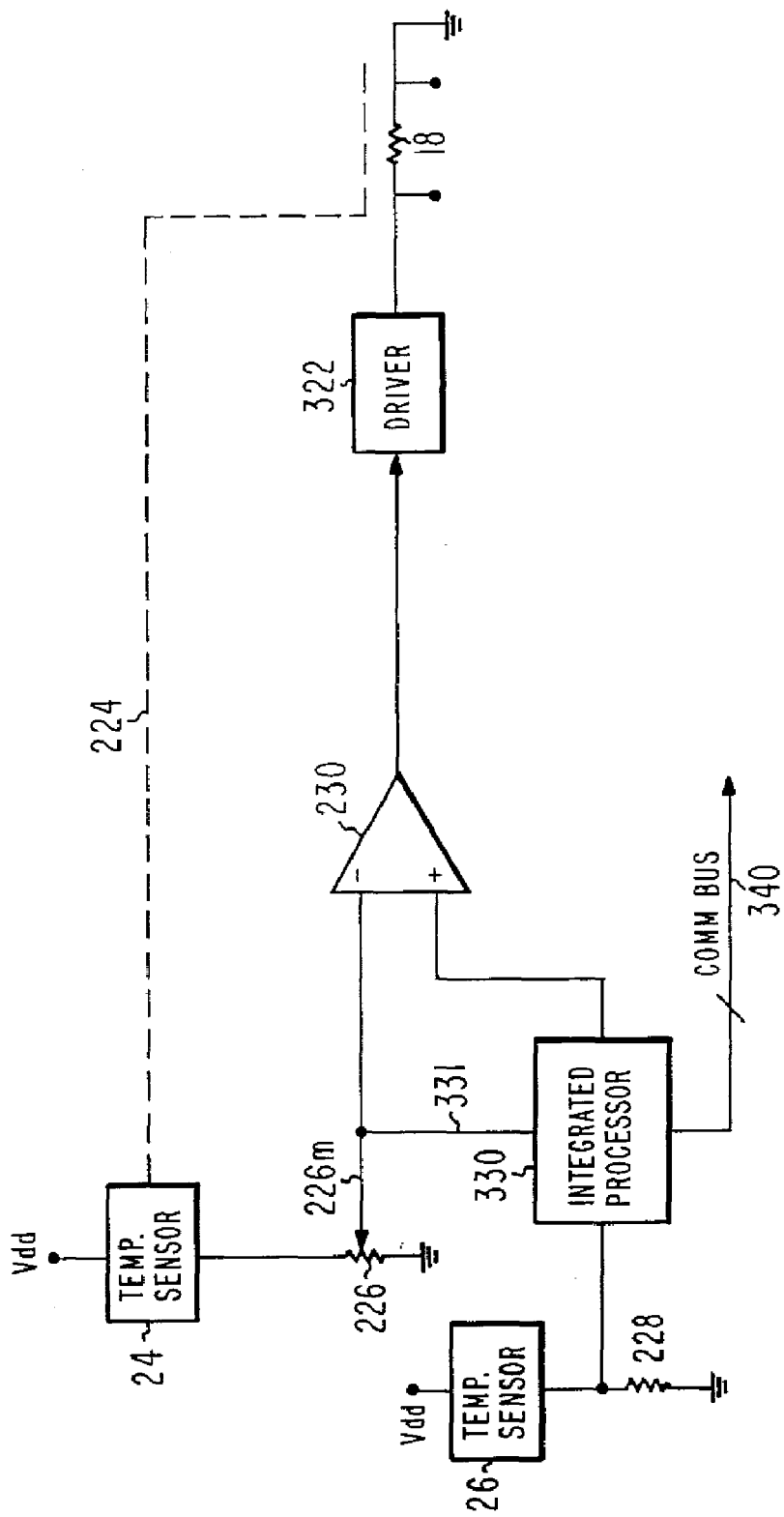
FIG. 5 is a simplified schematic diagram of a temperature controller in which one of the signals representing sensed temperature is digitized and reconverted to analog form.

FIG. 5 is a hybrid analog/digital temperature controller which may be used in the controller 20 of FIG. 1a. In FIG. 5, heater 18 is driven by driver block 322, which in turn is controlled by the analog output signal from an operational amplifier 230. The inverting input port of amplifier 230 is connected to the movable tap 226m on resistor 226, and resistor 226 is connected in series with temperature sensor 24 between voltage source Vdd and ground. Temperature sensor 26 is connected with resistor 228 as a voltage divider, and the voltage at the tap is applied to an integrated processor 330, which converts the analog voltage across resistor 228 into digital form, and provides the digital information to system bus 340. Movable tap 226m is connected to integrated processor 332 by a path 331 so as to make the temperature sensed by sensor 24 available to the system bus 340. The analog output signal of Neuron chip or processor module 330 is connected to the noninverting input port of amplifier 230. The operation of the arrangement of FIG. 5 is similar to that of the arrangement of FIG. 2, with the only difference lying in the digitization of the voltage across resistor 228, and the reconversion of the digitized value to analog form for application to amplifier 230. It will be apparent that the connection to the operational amplifier through the digital circuits 330 can be made for the temperature sensed by sensor 24 instead of for the temperature sensed by sensor 26. In this latter version, the variable resistor 226 can be replaced by a fixed resistor.

Figure 6:
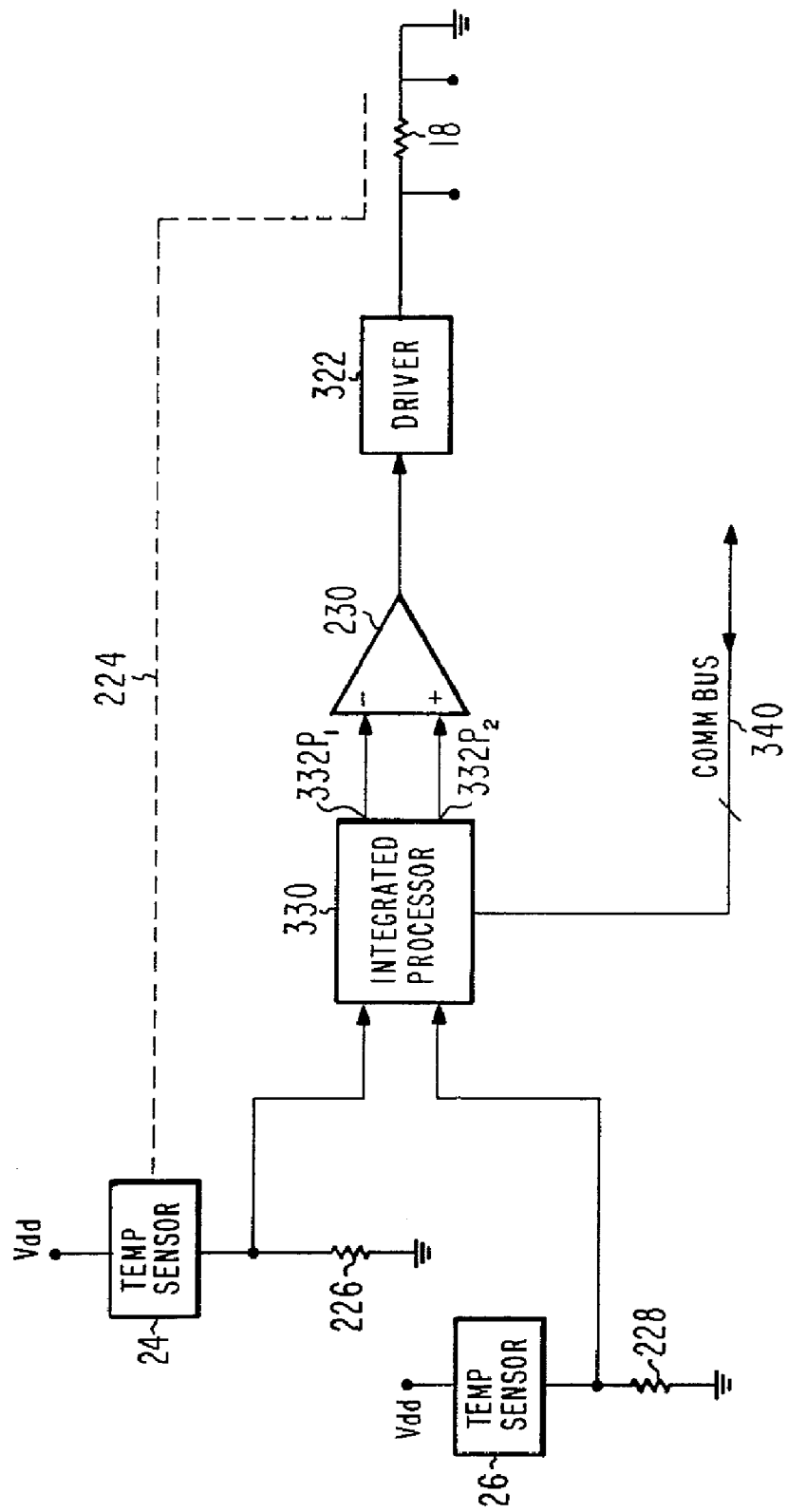
FIG. 6 is a simplified schematic diagram of a temperature controller similar to that of FIG. 5, in which both temperature signals are digitized.
Figure 7:
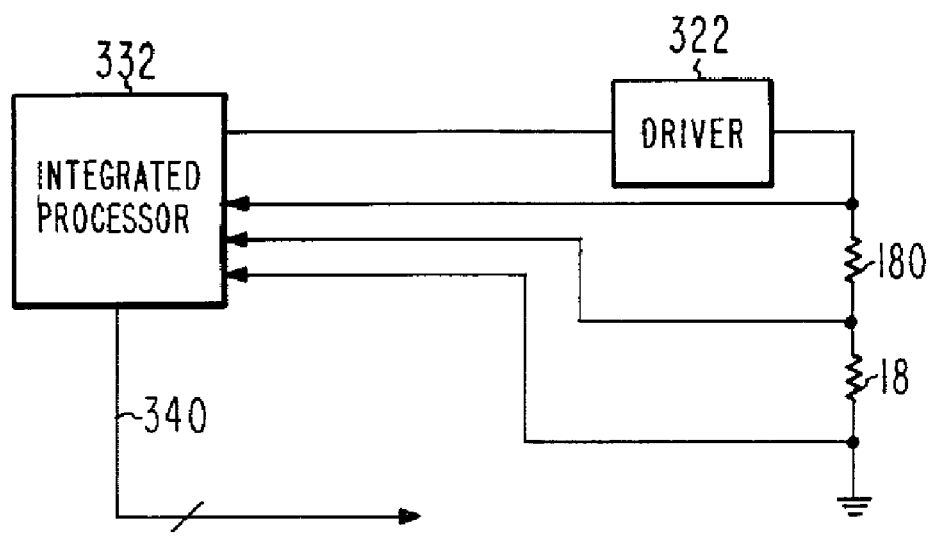
FIG. 7 is a detail of the processor and its connection for determination of heater temperature by the measurement of the heater electrical characteristics.

FIG. 6 illustrates an arrangement similar to that of FIG. 5, in which both the temperature-representative signals from resistors 226 and 228 are digitized within Neuron processor or integrated processor 330, and reconverted into analog form for application to the amplifier 230. In view of the detailed descriptions of FIGS. 2, 3, 4, and 5, it is only necessary to state that the module with integrated processor 330 includes two analog input ports, one for each temperature-related signal, and two analog output ports, designated $332P_1$ and $332P_2$, at which two analog temperature-representative signals appear. No further description of FIG. 6 is believed to be necessary for an understanding of the temperature control aspects of the invention.

In addition to control of the temperature of the heater as described above, controller 20 of FIG. 1a also performs further processing of the temperature information, together with memorized information, in order to determine the flow velocity through the path. The flow velocity v is given by $$v = \left[ k_1 \left( \frac{E^2}{\Delta T R_{heater}} \right) - k_2 \right]^{\frac{1}{m}} \qquad 1$$

where:

$k_1$ is a constant dependent upon wall temperature and the Prandtl number ($N_{Pr}$), which is the ratio of molecular momentum to thermal diffusivity;

$\Delta T$ is the temperature increment of the heater over the fluid temperature;

$k_2$ is a correction factor dependent upon the characteristics of the heater 18, the material 34, and the thermal connection therebetween; and m is a power or correction factor which is dependent upon the thermal electrical characteristics of the heater 18;

$R_{heater}$ is the electrical resistance of the heater; and

E is the voltage across the heater resistor.

In actual practice, the above equation (1), or equations obtained by similar derivations, may not provide as precise a reading or value as desired, due to the difficulty of determining the constants. A more precise value for the flow can be obtained by evaluating a polynomial, such as a $5^{th}$ order polynomial of the form $a+bx+cx^2+dx^3+ex^4+fx^5$, and determining the values of the coefficients of the polynomial by a calibration of the flow sensor against a known reference flow sensor placed in-line with the flow sensor being calibrated. The processing required in the controller 20 of FIG. 1 to evaluate such equations is straightforward, and requires no further description.

Once the flow velocity is determined by use of the processing described above, the flow may be determined in terms of volumetric flow (volume per unit time) by multiplying the flow velocity by the effective cross-section of the path or pipe in which the fluid is flowing. Ordinarily, the area is simply determined from the diameter of the pipe in which the flow is occurring. The processor memory 21 will, for this purpose, be preprogrammed with the characteristics of the flow sensor path, possibly including such a characteristic as area of the pipe with which the flow sensor is associated. The mass flow rate (mass per unit time) is simply determined by multiplying the volumetric flow rate by the mass density of the fluid. For this purpose, the processor of controller 20 of FIG. 1a which performs the processing will be preprogrammed with the characteristics of the fluid being measured and the physical dimensions of the fluid path. This information may be preprogrammed at the factory, or, if the type of fluid may change from time to time, the mass density characteristics may be uploaded to the processor memory by way of bus 20w of FIG. 1a or 340 of FIG. 3, 4, 5, 6, or 7. The resulting velocity, volumetric, or mass flow rate (or all of them) is (or are) transmitted from the sensor 10 over the bus 20w of FIG. 1a or 340 of FIGS. 3, 4, 5, 6, and or 7 to other locations or to a central location for use such as monitoring and or control.

In accordance with another aspect of the invention, the heater resistor is used to detect the temperature, thereby obviating the need for a physical temperature-measuring device such as 24 of FIG. 1a. More particularly, the heater is made from a material, such as nickel or platinum, whose resistance $R_{heater}$ changes with temperature, and the resistance of the heater is used as a measure of the temperature of the heater. In a first embodiment of this aspect of the invention, the heater is time-alternately provided with (a) heating current and (b) temperature-sensing current (I) that is obtained by measuring the voltage across a precision resistor 180 as shown in the system 700 of FIG. 7. Provision is also made for measuring the voltages (E) across the precision resistor 180 and the heater resistor 18. Signals representing the sensed heater voltage and current during the (b) intervals are applied to the processor for determination of the heater resistance. In this arrangement, the resistance of the heater resistor is determined during the "b" intervals or periods, as the quotient of E/I, and this resistance value is applied to a ROM for read-out of the corresponding temperature. In such an arrangement, the temperature sensing and the heating aspect of the flow determination are time-division multiplexed. Such an arrangement has the advantage of further reducing the number of parts in the assemblage, and substitutes solid-state control and processing for the second temperature sensor.

As an alternative to time-division multiplexing of the temperature-sensing and power-applying functions associated with the heater, the power-applying function may be performed continuously, and the resistance determination for temperature determination may be performed by simply measuring the applied electrical voltage (E) and the resulting current (I), and taking the quotient of E/I.

Figure 8:
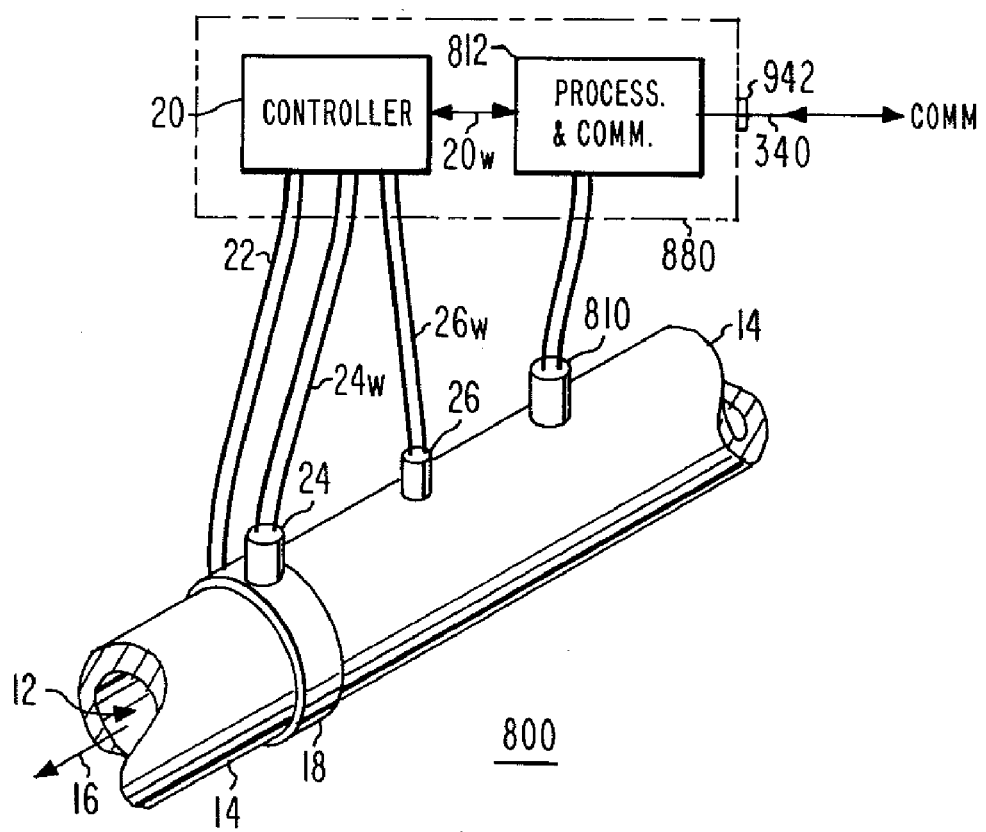
FIG. 8 is a simplified perspective or isometric view of an integrated flow sensor in accordance with an aspect of the invention.

FIG. 8 is a simplified perspective or isometric view of a flow sensor as described in conjunction with FIGS. 1-7, where the hyphen represents the word "through," in conjunction with a pressure sensor, according to another aspect of the invention. In FIG. 8, the integrated sensor 800 further includes a ratiometric pressure sensor 810 which senses the pressure within the fluid flow channel 12, and produces an output signal in the form of a voltage which is in a proportion to an applied voltage, preferably a direct voltage. Thus, at constant pressure, the output of the ratiometric pressure sensor is always a fixed proportion of the applied voltage. Variations in the sensed pressure, of course, result in different division ratios, and therefore different output voltages. The voltages associated with pressure sensor 810 are coupled to a processor and communication block designated 812. Block 812 performs the conversion of the pressure sensor output signal into a digital signal representing the pressure value. Either block 20 or block 812 of FIG. 8 converts the various sensor signals for transmission over digital bus or communication path 340. If block 20 of FIG. 8 contains only the temperature control portion of the flow sensor, block 812 may perform the other processing functions described above for the flow sensor, such as conversion of temperature into flow, as well as the conversion of pressure ratio into pressure value. In any case, either or both blocks 20 and 812, acting together, convert the flow value, temperature, and pressure signals provided by the sensors into digital signals for transmission over digital path 340, and receive digital signals from the bus as may be required, for the purpose of changing coefficients, so as to convert the use from one fluid to another.

Pressure sensor 810 of FIG. 8 is, as mentioned, of the ratiometric type. Such sensors can be in the preferred form of a microelectromechanical system (MEMS) device, which are available on the commercial market. A particular such sensor is type P155, available from Kavlico Corporation, of 14501 Los Angeles Avenue, Moorpark, Calif. 93021. This particular pressure sensor includes temperature compensation, so no temperature processing of a pressure-and-temperature representative signal is necessary to determine the pressure, but the sensor signal can be used directly, without temperature compensation. Others of these types of sensors lack internal temperature compensation, in which case the signal from temperature sensor 24 or 26 of FIG. 8 (or both) may be used to perform the temperature compensation of the temperature-dependent signal representing the pressure.

Figure 9:
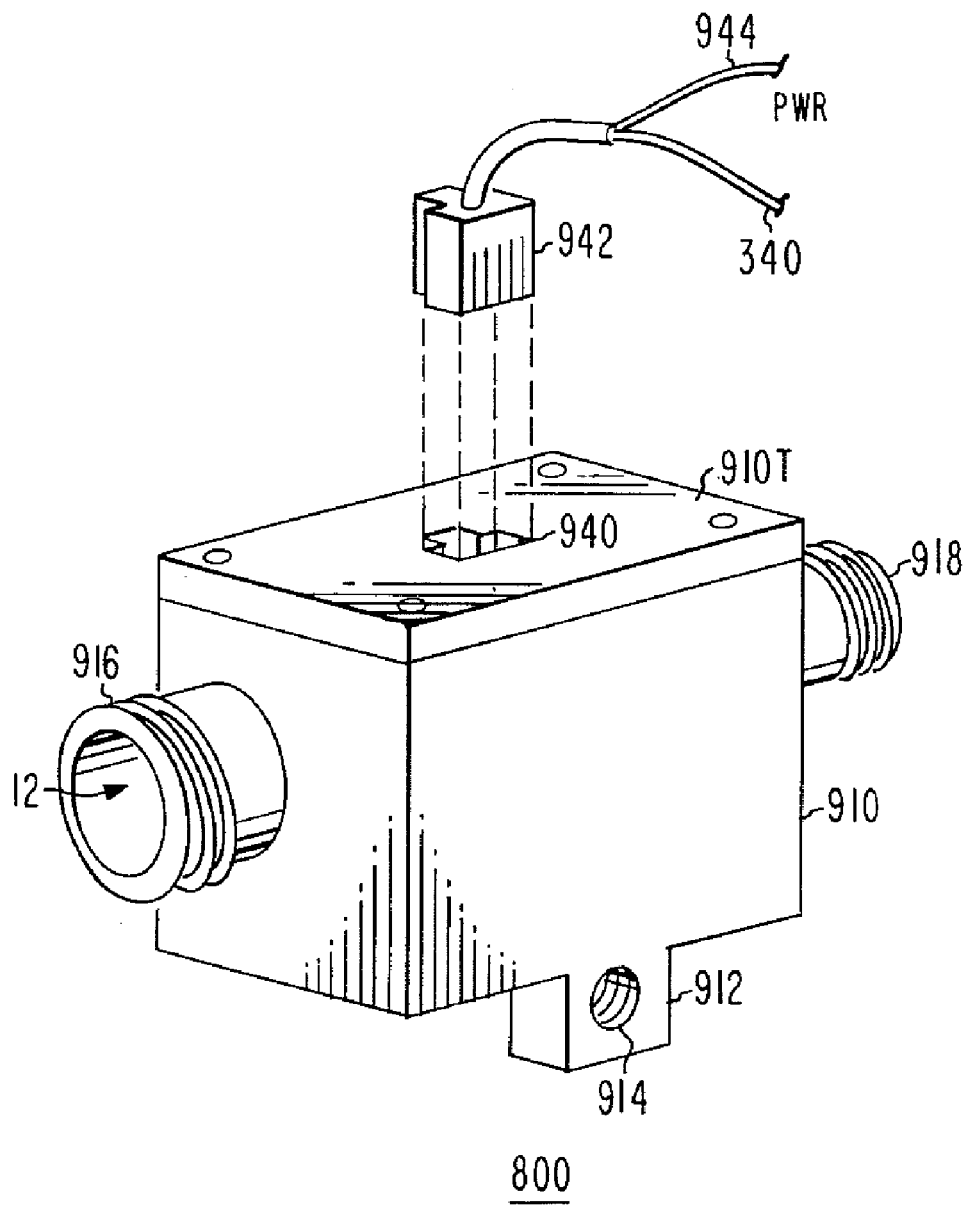
FIG. 9 is a representation of a possible external appearance of such an integrated sensor.

FIG. 9 represents a possible external appearance of an integrated sensor according to an aspect of the invention, in which integrated sensor 800 is associated with a body 910 including a mounting arrangement in the form of a boss 912 defining a threaded aperture 914. A housing top or cover 910T covers an internal cavity within body 910 in which portions of the integrated sensor are mounted. Body 910 is associated with (or preferably monolithically integral with) first and second threaded fluid ports 916 and 918, which give access to fluid path 12 of the flow/pressure sensor 800 of FIG. 8. Electrical connections to the interior of body 910 are provided by the pins of a female connector 940, which is illustrated as being a conventional modular RJ-45 type connector, which is currently in widespread use for computer and communication network connections. A mating male connector is illustrated as 942 in FIG. 9. It has been found that such connectors may also be used for providing electrical power to the heater, ratiometric pressure sensor, and processors of an integrated sensor 800. As illustrated in FIG. 9, connector 942 is connected to communication bus conductors 340 and to power conductors 944. However, separate bus and power connections may be used, if desirable. The shape of the body 910 of an integrated sensor will, of course, depend on the application to which the sensor is used, and need have no particular shape.

Figure 10:
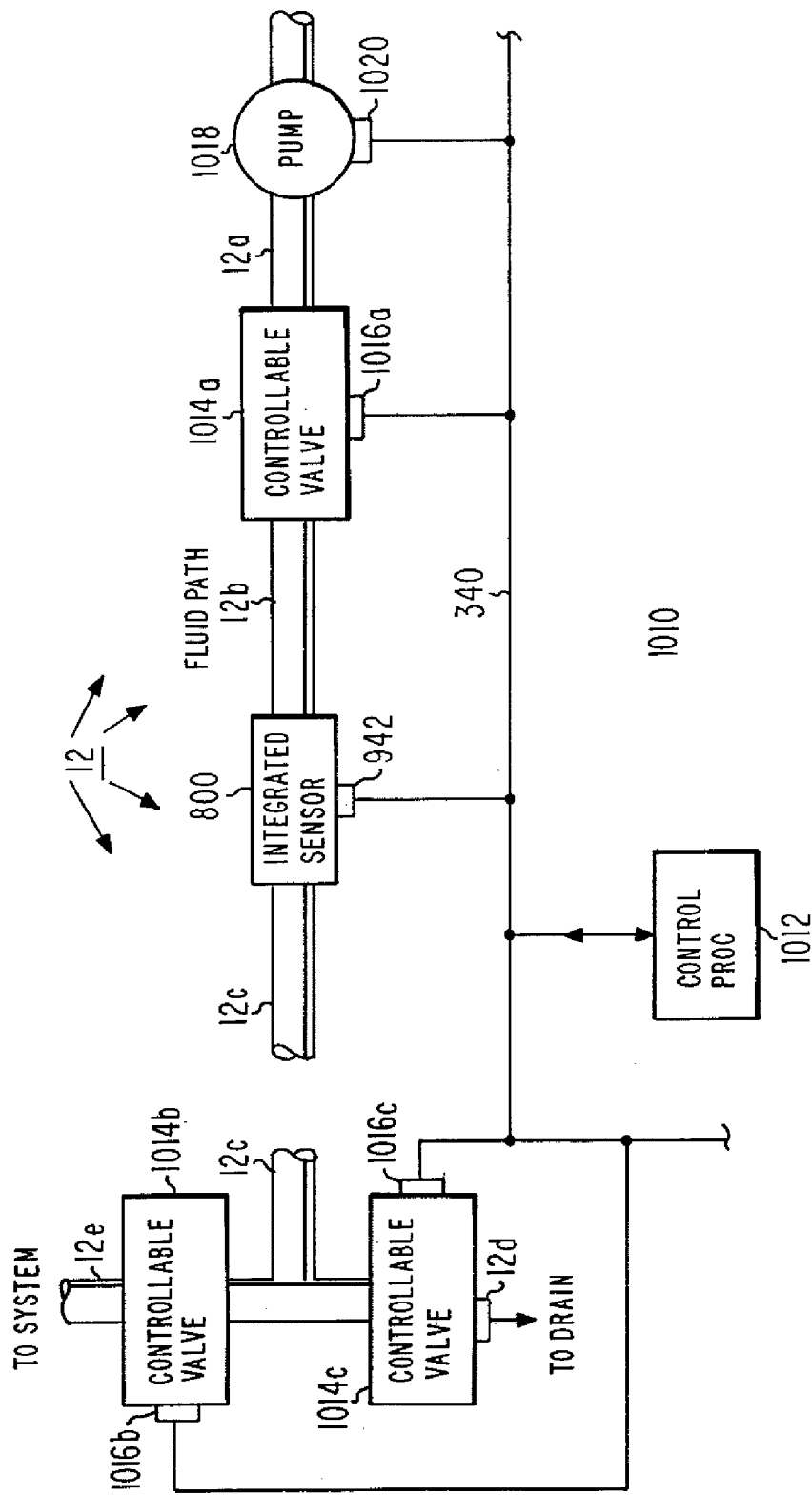
FIG. 10 is a simplified representation of a portion of a fluid system including flow control and monitoring by an integrated flow, temperature, and pressure sensor, in the context of a local communications network.

FIG. 10 is a simplified representation of a portion of a fluid system including flow control and monitoring by an integrated flow, temperature, and pressure sensor, in the context of a local communications network. In FIG. 10, a flow of fluid pressurized by a controllable pump 1018 is applied through a portion 12*a* of a fluid path 12 to a remotely-controllable valve 1014*a*, which can control the flow of fluid by way of a fluid path portion 12*b* to integrated sensor 800. The fluid flowing through various portions of the system of FIG. 10 is controlled by valves 1014*a*, 1014*b*, and 1014*c*, and a portion of the flow is monitored by integrated sensor 800. More particularly, fluid pressurized by pump 1018 and applied through valve 1014*a* and sensor 800 flows in path portion 12*c* to valves 1014*b* and 1014*c*. Valve 1014*b* controls the flow to a further portion 12*e* of the system, and valve 1014*c* controls flow by way of a path portion 12*d* to a drain. Controllable valves 1014*a*, 1014*b*, and 1014*c*, and integrated flow, temperature, and pressure sensor 800, are connected to communication path 340, which will ordinarily be part of a local area network. More particularly, integrated sensor 800 is connected to path 340 by a connector 942. Also, valve 1014*a* is connected to communication path 340 by a connector 1016*a*, valve 1014*b* is connected to path 340 by a connector 1016*b*, and valve 1014*c* is connected to path 340 by a connector 1016*c*. With these connections, both the integrated sensor 800 and the valves 1014*a*, 1014*b*, and 1014*c* can communicate with any terminus of the communication system to which path 340 extends. Among the terminals which are connected to path 340 is a system control processor 1012, which may be considered to be, for example, a workstation or personal computer. Control processor 1012 is preprogrammed with software for monitoring and controlling the fluid paths which communicate with the control processor. More particularly, control processor 1012 can control the position of valves 1014*a*, 1014*b*, and 1014*c*, and any other valves which may be in the system, and it can read the flow, temperature, and pressure at the integrated sensor 800, and from any other sensors which may be in the system.

A salient advantage of the system such as that described in conjunction with FIG. 10 is the ability to self-monitor certain aspects of the various sensors and controls. For example, to verify the functioning of the flow sensor aspect of the integrated sensor 800, processor 1012 may command valves 1014*a* and 1014*c* to open from an initial closed state, and also command pump 1018 to operate. Flow sensor 800 should report an increase in flow and an increase in pressure, if the pressure had previously been released. The occurrence of such an increase in flow in response to such a pump and valve condition indicates that the flow sensor aspect of the integrated sensor is at least grossly functional. Of course, if valve 1014*b* had been open, and the system beyond valve 1014*b* were in a state such that flow would occur, the command to open valve 1014*c* would not be necessary. The pressure aspect of the integrated sensor can be verified by stopping pump 1018, opening valves 1014*a* and 1014*c*, to thereby drop the pressure at sensor 800 to near-zero pressure. The sensed pressure should drop to near zero. Valve 1014*c* is then closed, and the pump started; the sensed pressure should rise if the pressure sensor is operative.

In order to verify that a valve is operating in response to a command, commanding operation of the valve to its extreme values (open and shut) should result in either a change in pressure at the integrated sensor 800, or a change in flow. Even if valves 1014*b* and 1014*c* are closed, changing the operating state of pump 1018 in the open and closed states of valve 1014*a* should give different pressure values at integrated sensor 800. Thus, the integrated flow, temperature and pressure sensor, in conjunction with controllable valves and or pumps, is capable of a certain amount of self-test in a system context.

A very useful arrangement of the integrated flow, temperature and pressure sensors, according to an aspect of the invention, is to place one such sensor on each side of a control valve. This allows verification of the operation of each valve by, at the system level, noting a decrease in flow in both sensors in response to a command to close the valve, together with a decrease in pressure at the downstream sensor, without a corresponding decrease in pressure at the upstream sensor. This same arrangement also has the further advantage of providing an indication in the event of breakage of a pipe at a location between two sensor/valve arrangements. The existence of such a break or leak can be verified by comparing the flows through the two integrated sensors on either side of the break under various conditions of the valves. If one valve is closed, and the flow through the associated integrated sensor decreases to zero, but the flow through the sensor on the other side of the break does not also go to zero, the presence of a break or leak is established. Also, a crude calibration of the accuracy of the flow sensors associated with each valve can be made by partially closing the valve, which should result in a pressure change; the flows in the two adjacent sensors should be equal, and the downstream sensor should sense a pressure drop relative to the upstream sensor.

Figure 11:
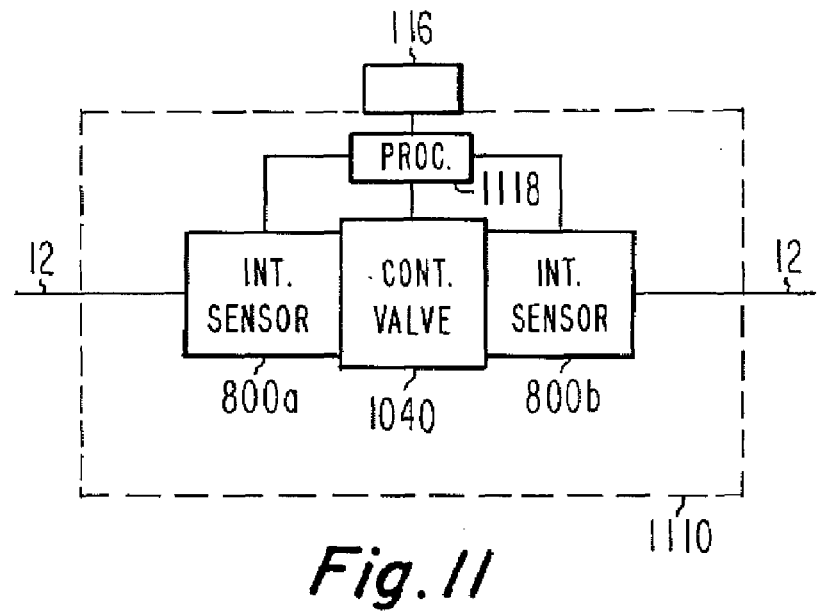
FIG. 11 is a simplified diagram of an integrated device including two flow/pressure sensors and a controllable valve, adapted for use in a controllable system.

FIG. 11 represents a combination of two flow, temperature, and pressure sensors integrated with a controllable valve. In FIG. 11, a body 1110 encloses, or is associated with, a controllable valve designated as 1014. Valve 1014 has a flow, temperature, and pressure sensor 800*a* on one side of its fluid port, and a flow, temperature, and pressure sensor 800*b* on the other side of its fluid port. This integrated arrangement simplifies a system in which such sensors are desirable on each side of the controllable valve. Both sensors 800*a* and 800*b*, and the controllable valve 1014, are coupled to a processor 1018, which performs all of the signal processing functions for normalizing and compensating the sensor signals as may be necessary, communicates with the network by way of a connector 1116. Processor 1018 also receives commands and constants from the network connected to connector 1116, as may be required, and translates the commands to drive the valve to the desired state, and to operate the temperature and flow sensors in the desired manner.

Figure 12:
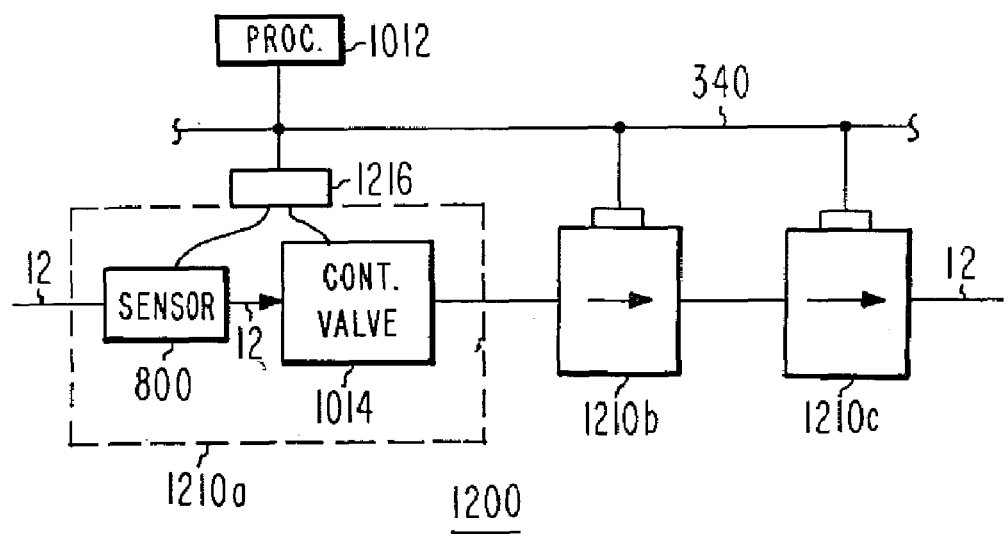
FIG. 12 is a representation of a portion of a plumbing system in which a pipe is broken into sections separated by integrated devices, most of which include a single flow/pressure sensor and a controllable valve, connected together by a communication bus, for providing the capability of determining the presence of a leak or break in the pipe.

In some applications, valves may be effectively connected in series by pipes or fluid flow paths which contain no branches. This is particularly true in combat ships, in which valves may spaced along a pipe to provide isolation in the event of damage. In such a situation, the same function as that provided by the two-sensors-plus-valve integrated structure of FIG. 11 may be achieved with a single-sensor-plus-valve integrated arrangement, such as that illustrated as 1210*a* in FIG. 12. The structure of 1210*a* in FIG. 12 includes a single flow, temperature, and pressure sensor 800 on one side, which is arbitrarily designated as the "upstream" side, of a controllable valve 1014. Similar single-sensor/valve combinations 1210*b* and 1210*c* are connected downstream from structure 1210*a* in flow path 12, separated from each other by lengths of pipe. So long as the structures 1210*b* and 1210*c* are connected in the same "upstream" orientation, two of the three valves in the system of FIG. 12 have one integrated sensor on their upstream sides, and another integrated sensor (the one associated with the next downstream structure) on their downstream sides. More specifically, controllable valve 1014 of structure 1210*a* has its own flow sensor 800 on its upstream side, and the corresponding sensor of structure 1210*b* on its downstream side. The single-flow-sensor-plus-valve integrated structure 1210*b* has its own (internal) flow sensor upstream of its own (internal) valve, and the corresponding flow sensor of the next adjacent integrated sensor 1210*c* acts as the downstream flow sensor of the valve of integrated structure 1210*b*. Thus, many of the valves of an installation of integrated flow-sensor/valves such as that illustrated as 1210*a* of FIG. 12 will have the benefit of a flow sensor on "both" sides of the valves. The last structure in the system, which is structure 1210*c* in the system of FIG. 12, does not have a downstream flow sensor, so the last integrated flow-sensor/valve in the path cannot do all of the tests described above. However, it may not be necessary to determine downstream flow for the last valve, or if such a measurement is desired, an additional independent flow sensor may be placed in-line downstream of the integrated flow-pressure sensor. The cost advantage of an integrated single-flow-sensor-plus-valve over the cost of an integrated two-flow-sensors-plus-valve may be advantageous in the context of long paths such as those of FIG. 12. It should be noted that in the context of the description of FIG. 12 the term "upstream" and "downstream" have been used; these terms are used for simplicity, and the system integrity is not dependent upon the direction of flow of fluid in the pipe or path 12.

Other embodiments of the invention will be apparent to those skilled in the art. For example, while the heating element has been described as being electrical, for convenience of control, the heat could instead be provided by a flame, by thermal conduction from a remote heat source, or the like. While only a single temperature sensor 24 is illustrated as being associated with the heater, and a single sensor 26 with the flow path, those skilled in the art will recognize that plural temperature sensors spaced about the fluid flow path may be used to generate a more accurate equivalent temperature measurement.

Thus, the invention, according to an aspect of the invention, lies in an integrated fluid flow, temperature and pressure sensor (800; 800*a*, 800*b*), which includes a body (910, 1110). The body (910, 1110) includes or contains a path (12), such as a pipe, for the flow of fluid. The integrated sensor (800; 800*a*, 800*b*) also includes a temperature determining means (26) or temperature sensor located within the body (910, 1110), and coupled to the path (12), for making a determination of the upstream temperature of a fluid flowing in the path (12): in some cases, the upstream temperature may be determined by a downstream temperature sensor. A heating means (18) or heater is located within the body (910, 1110), and is at least thermally coupled to the path (12), for heating the fluid therein. A control means (20, 220) or controller is located within the body (910, 1110), and is coupled to the heating means (18) and to the temperature determining means (26), for applying power to the heating means (18) in an amount required to raise the temperature of the heating means (18) above the upstream temperature by a predetermined amount. The control means (20, 220) may also convert the value of the power into a flow signal representing a corresponding flow. A pressure sensing means (810) or sensor is located within the body (910, 1110), for sensing fluid pressure in the path (12), for generating an electrical signal representative of the pressure of the fluid. The pressure-representative signal will ordinarily be an analog signal. A signal processing means (812) or processor is located within the body (910, 1110), and coupled to the control means (20, 220), to the temperature determining means (26), and to the pressure sensing means (810), for processing the flow signal, the temperature signal, and the pressure signal, for generating digital signals representing the flow, the temperature, and the pressure. The digital signals are preferably in a format suitable for transmission over a digital signal transmission path (20*w*, 340). A signal connection means (940, 942, 1116, 1216) or connector is mounted on the body (910, 1110), and is connected to at least the signal processing means (812), for providing a standard connection between the signal processing means (812) and the signal transmission path (20*w*, 340).

In one embodiment of the integrated sensor (800; 800*a*, 800*b*), the control means (20, 220) comprises a second temperature determining means (24) or temperature sensor coupled to the heating means (18), for determining the temperature of the heating means (18). The second temperature determining means (24) may be an electrical resistor, and may include resistance measuring means (700) coupled to the heating means (18) for measuring the electrical resistance of the heating means (18), and the control means (20, 220) may include means (21) for converting the value of the resistance into a corresponding temperature.

In an embodiment of the integrated sensor (800; 800*a*, 800*b*), the control means (20, 220) comprises a memory (21) preprogrammed with a value corresponding to the cross-sectional area of the path (12), and the flow determination is in the form of one of (a) mass quantity per unit time, (b) volume per unit time, and (c) both mass quantity and volume per unit time.

In an embodiment of the integrated sensor (800; 800*a*, 800*b*), the path (12) is associated with a peripheral wall (14, 34), and the heating means (18) is in the form of a peripheral structure surrounding the peripheral wall (14, 34), and in thermal contact therewith.

In an avatar of the integrated sensor (800; 800*a*, 800*b*), the peripheral wall (14) is made from conventional materials (33) having a thickness (T) commensurate with the pressure and temperature of the fluid, except in the region (36) in or near that in which the heating means (18) is thermally coupled, in which region the peripheral wall is made from a material (34) having higher strength than the conventional materials, of a thickness (t) less than the commensurate thickness (T).

In another avatar of the integrated sensor (800; 800*a*, 800*b*), the control means (20, 220) and the signal processing means (812) are integrated into a single unit (880), which may be, for example, a single printed wiring card or a single closed electronics module.

According to one version of the integrated sensor (800; 800*a*, 800*b*), the pressure sensing means (810) is a ratiometric pressure sensor, and preferably of the microelectromechanical system (MEMS) type.

In one very advantageous embodiment, the integrated sensor (800; 800*a*, 800*b*) is further integrated with a remotely controllable valve (1014). In this embodiment, a controllable valve (1014) having a controllable flow channel is connected by a further fluid path (12) to the flow path (12) of the integrated sensor (800; 800*a*, 800*b*). The controllable valve (1014) is located within the same body (910, 1110) as that in which the integrated sensor (800; 800*a*, 800*b*) is located. This particular embodiment is most advantageously used in a system (1200) further including a control processor (1012) at a location remote from the body (910, 1110) of the integrated sensor (800; 800*a*, 800*b*), and coupled thereto by way of the transmission path (340), for correlating valve state with fluid flow for one of (a) verifying operation of an element of the integrated sensor (800; 800*a*, 800*b*) and (b) verifying the integrity of fluid path (12)s to which the integrated sensor (800; 800*a*, 800*b*) is connected.

What is claimed is:

1. An integrated fluid flow, temperature and pressure sensor, said sensor comprising:
    a body including a path for the flow of fluid:
    temperature determining means located within said body, and coupled to said path, for making a determination of the upstream temperature of a fluid flowing in said path:
    heating means located within said body, and coupled to said path, for transferring heat from said heating means to said fluid;
    control means located within said body, and coupled to said heating means and to said temperature determining means, for applying power to said heating means in an amount required to raise the temperature of said heating means above said upstream temperature by a predetermined amount, and for converting the value of said power into a flow signal representing a corresponding flow;
    pressure sensing means located within said body, for sensing fluid pressure in said path at a location adjacent to one of said heating means and said temperature determining means, for generating an electrical signal representative of the pressure of said fluid;
    signal processing means located within said body, and coupled to said control means, to said temperature determining means, and to said pressure sensing means, for processing said flow signal, said temperature signal, and said pressure signal, for generating digital signals representing said flow, said temperature, and said pressure, for transmission over a digital signal transmission path; and
    signal connection means mounted on said body, and connected to at least said signal processing means, for providing a standard connection between said signal processing means and said signal transmission path.

2. A sensor according to claim 1, wherein said pressure sensing means located within said body, generates an analog electrical signal representative of the pressure of said fluid.

3. An integrated sensor according to claim 1, wherein said control means comprises a second temperature determining means coupled to said heating means, for determining the temperature of said heating means.

4. An integrated sensor according to claim 3, wherein said second temperature determining means is an electrical resistor, and said second temperature determining means comprises means coupled to said heating means for measuring the electrical resistance of said heating means, and said control means comprises means for converting the value of said resistance into a corresponding temperature.

5. An integrated sensor according to claim 1, wherein said control means comprises a memory preprogrammed with a value corresponding to the cross-sectional area of said path, and said flow determination is in the form of one of mass quantity per unit time and volume per unit time.

6. An integrated sensor according to claim 1, wherein said path is associated with a peripheral wall, and wherein said heating means is in the form of a peripheral structure surrounding said peripheral wall, and in thermal contact therewith.

7. An integrated sensor according to claim 6, wherein said peripheral wall is made from conventional materials having a thickness commensurate with the pressure and temperature of said fluid, except in a region near that in which said heating means is thermally coupled, in which region said peripheral wall is made from a material having higher strength than said conventional materials, of a thickness less than said commensurate thickness.

8. An integrated sensor according to claim 1, wherein said control means and said signal processing means are integrated into a single unit.

9. An integrated sensor according to claim 1, wherein said pressure sensing means is a ratiometric pressure sensor.

10. An integrated sensor according to claim 1, wherein said pressure sensor is a microelectromechanical system device.

11. An integrated sensor according to claim 1, further comprising
    a controllable valve having a controllable flow channel connected by a further fluid path to said flow path of said integrated sensor, said controllable valve being within said body; and
    a control processor at a location remote from said body of said integrated sensor, and coupled thereto by way of said transmission path, for correlating valve state with fluid flow for one of (a) verifying operation of an element of said integrated sensor and (b) verifying the integrity of fluid paths to which said integrated sensor is connected.

12. An integrated fluid flow, temperature and pressure sensor, said sensor comprising:

a body including a path for the flow of fluid in a region:

a temperature sensor located within said body, and coupled to said path, for making a determination of the upstream temperature of a fluid flowing in said path:

a heater located within said body, and thermally coupled to said path, for transferring heat from said heater to said fluid;

a controller located within said body, and coupled to said heater and to said temperature sensor, for applying power to said heater in an amount required to raise the temperature of said heater above said upstream temperature by a predetermined amount, and for converting the value of said power into a flow signal representing a corresponding flow;

a pressure sensor located within said body, for sensing fluid pressure in said path, for generating an electrical signal representative of the pressure of said fluid;

a signal processor located within said body, and coupled to said controller, to said temperature sensor, and to said pressure sensor, for processing (a) said flow signal, (b) said temperature signal, and (c) said signal representative of the pressure, for generating digital signals representing said flow, said temperature, and said pressure, for transmission over a digital signal transmission path; and a signal connector mounted on said body, and connected to at least said signal processor, for providing a standard connection between said signal processor and said signal transmission path.

* * * * *